April 9, 1968        D. G. HUGLEY        3,376,898

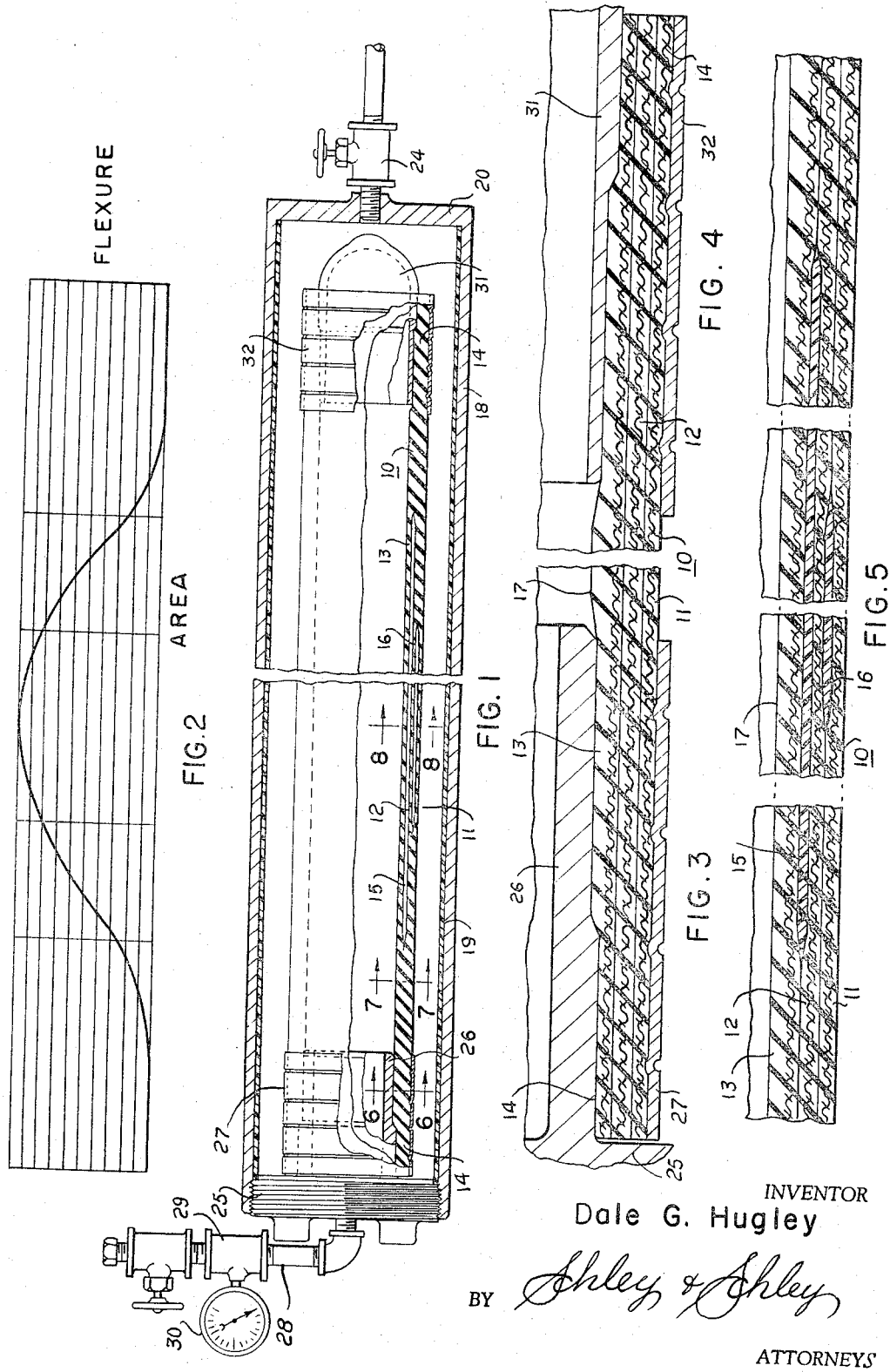

FLEXIBLE MEMBRANE

Filed June 21, 1965        2 Sheets-Sheet 2

INVENTOR
Dale G. Hugley

BY *Ashley & Ashley*

ATTORNEYS

United States Patent Office 3,376,898
Patented Apr. 9, 1968

3,376,898
FLEXIBLE MEMBRANE
Dale G. Hugley, Dallas, Tex., assignor, by mesne assignments, to Koehring Company, Milwaukee, Wis., a corporation of Wisconsin
Filed June 21, 1965, Ser. No. 465,317
1 Claim. (Cl. 138—137)

ABSTRACT OF THE DISCLOSURE

A flexible membrane in which any desired number of layers of reinforcing material such as canvas may be vulcanized, the entire assembly being vulcanized together at its margins and constituting discrete, separate layers in its central portion to retain the flexibility of the membrance while providing extremely high strength thereto.

---

Figure 10:
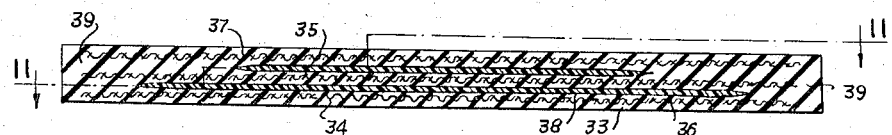

This invention relates to new and useful improvements in flexible membranes.

The invention is directed in particular to various membranes such as pressure sleeves, diaphragms, and the like which must withstand high pressures and hence be relatively strong, yet which must retain their ability to flex under varying pressures.

In order for a flexible membrane to be capable of withstanding high pressures, it must have embedded therein numerous layers or plies of reinforcing material, and as the number of layers is increased, the flexibility of the membrane decreases which, in a conventional flexible membrane, ultimately leads to the point at which the flexibility of the membrane is so low that the membrane will not function properly. Under the present invention, the medial portions of the membranes may be divided into discrete layers so that the flexibility or relatively thin membranes is retained. The zones of separation between the adjacent layers forming the medial portion of the flexible membrane are also of differing or progressively reduced areas in order that the zone or area of flexibilizing of the membrane is spread over a greater expanse, thus overcoming any tendency to flex primarily in one relatively small zone with its attendant disadvantages.

It is, therefore, a principal object of the invention to provide an improved flexible elastomer membrane in which may be incorporated a multiplicity of layers of reinforcing material without greatly affecting the flexibility of the membrane.

Yet another object of the invention is to provide improved flexible elastomer membranes having their marginal portions vulcanized into homogeneity and their medial portions divided into two or more layers, each of which has embedded therein multiple layers of reinforcing material to provide a flexible membrane resistant to relatively high pressures.

Still another object of the invention is to provide an improved flexible elastomer membrane having its medial portion divided into discrete layers with separation zones between adjacent layers, the separation zones progressively decreasing the area from the high pressure side of membrane toward the lower pressure side thereof.

An additional object of the invention is to provide an improved flexible elastomer membrane particularly adapted for use as pressure tubes and diaphragms subjected to relatively high pressure differentials while retaining the desired flexibility of the membrane.

Another object of the invention is to provide an improved flexible elastomer membrane having increased or enhanced resistance to repeated flexing.

A further object of the invention is to provide an improved flexible elastomer membrane in which, if it is of sufficient area, almost any number of reinforcing plies may be incorporated.

Still another object of the invention is to provide an improved flexible elastomer membrane so constructed that the flexure points are shifted toward the middle or center of the membrane and away from the marginal portions thereof.

Other and more particular objects of the invention will be apparent from the reading of the following description.

A construction designed to carry out the invention will be hereinafter described, together with other features of the invention.

Figure 6:
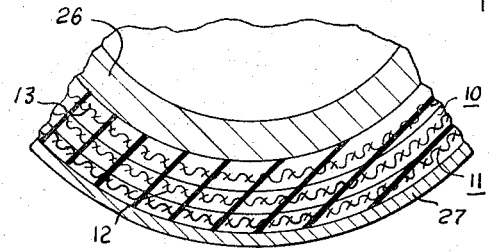
Figure 7:
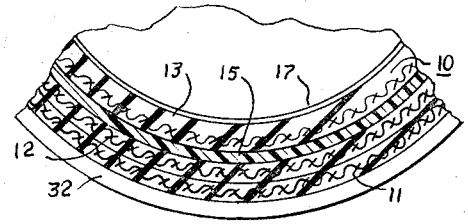
Figure 11:
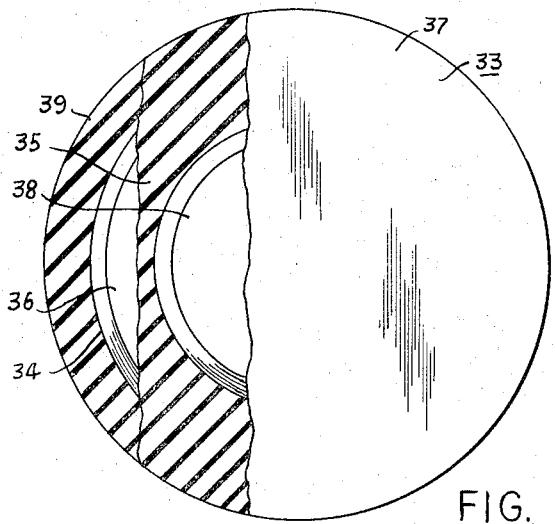
Figure 8:
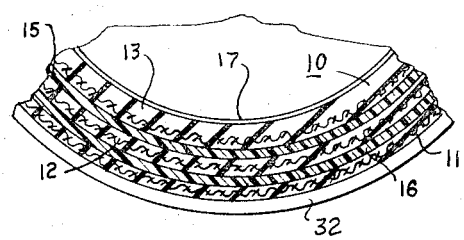
Figure 9:
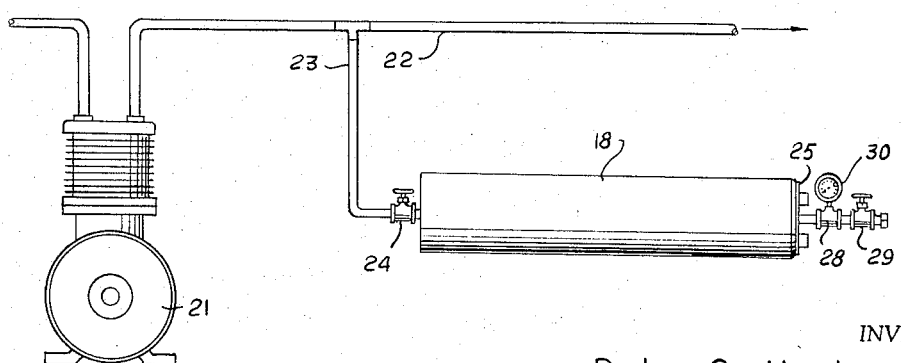

The invention will be more readily understood from a reading of the following specification and by reference to the accompanying drawings, wherein examples of the invention are shown, and wherein:

FIG. 1 is a longitudinal view of a pressure tube constructed in accordance with this invention, the view being partly in elevation and partly in section and showing the tube mounted in an enclosure for use as a surge dampener, FIG. 2 is a graph illustrating the manner in which the tube flexes under the application of pressure internally, FIG. 3 is an enlarged, fragmentary, longitudinal sectional view of the clamping means for the charging end of the pressure tube, FIG. 4 is an enlarged, fragmentary, longitudinal sectional view illustrating the clamping means for the plug end of the pressure tube, FIG. 5 is an enlarged, fragmentary, longitudinal sectional view illustrating the arrangement of the separating layers disposed internally of the pressure tube, FIGS. 6, 7 and 8 are enlarged, fragmentary, cross-sectional view taken upon the respective lines of FIG. 1, FIG. 9 is a schematic view illustrating the connection of the surge dampener into a compressor system, FIG. 10 is a cross-sectional view of a diaphragm constructed in accordance with the invention, and FIG. 11 is a plan view, partly broken away, of the diaphragm of FIG. 10.

In the drawings, the numeral 10 designates a flexible membrane in the form of an elongate flexible tube formed of natural or synthetic rubber or any other suitable or desirable elastomer. The particular embodiment illustrated includes an outer layer or sheet 11 of elastomer, an intermediate layer or sheet 12, and an inner layer or sheet 13. Each of the layers or sheets 11, 12 and 13, have embedded and bonded therein a multiplicity of layers of reinforcing material, usually from two to four layers, but any number of layers may be employed in accordance with the degree of flexibility desired, the reinforcing material being any suitable or desirable material such as fabrics like canvas, various cording of cotton, nylon, or other suitable materials, or any other type of high strength flexible reinforcing material as customarily employed in this art. The reinforcing material may be a criss-cross arrangement of cords laid at an angle to impart stretchability to the tube, the use of nylon as reinforcing fibers also permitting the tube to stretch. In the particular employment of the tube in a surge dampener as shown in the drawings, the tube primarily flexes and does not necessarily stretch, at least to any appreciable degree.

At the end or marginal portions of the tube 10, the three layers 11, 12 and 13 are vulcanized together into a homogeneous mass 14, the inner layer 13 being unbonded to or unvulcanized to the intermediate layer 12 throughout an annulus 15 extending from near one end portion 14 of the tube to the other end portion thereof. Similarly, the intermediate layer 12 is unvulcanized to the outer layer 11 over the entire area of an annulus 16 extending from points spaced farther from the end portions 14 than the ends of an annulus 15. Thus, the zones in which there is no vulcanization between adjacent layers decreases progressively in area from the internal or pressure side of the tube 10 to the outer surface thereof. Thus, in resume', at the end portions of the pressure tube, all three layers are vulcanized together, at a point spaced from the end portions only the outer two layers are vulcanized together, and at the central area none of the layers is vulcanized to another layer, but instead, each layer is vulcanized in and of itself to provide a cured and finished product and to anchor and embed the layers of reinforcing material in the elastomer layers. The adjacent elastomer layers are separated from one another as previously described, and hence, each layer may function separately insofar as flexing is concerned. The result is a membrane of very high strength resistant to very high pressures but yet a membrane retaining the desired degree of flexibility.

In actual practice, the membrane flexes as illustrated in FIG. 2 of the drawings in which flexure has been plotted against area, or in the case of the pressure tube of FIG. 1, the lengthwise dimension of the tube. This flexure configuration is attained through the use of the progressively decreasing areas of elastomer layer separation, the pressure tube of FIG. 1 being most flexible at its central portion and becoming progresilevly less flexible toward its end portions. Thus, the tendency of the presure tube to flex primarily in one area or zone with resultant damage to the tube is avoided.

To fabricate a pressure membrane in accordance with this invention, the layers of unvulcanized elastomer, such as a synthetic rubber, and plies of reinforcing material are laid up in the usual manner, their being interposed in the assembly over the areas or zones of layer separation desired, such as 15 and 16, a suitable separation sheet which may be anything that will not bond to the elastomer, such materials as Teflon which is polytetrafluoroethylene or a suitable nonbonding coating being employed. The entire assembly is then vulcanized in the usual manner, thus forming the several layers into homogeneous masses and forming the marginal portions of the pressure membrane into single homogeneous masses. The separation sheets prevent the vulcanization or forming of adjacent elastomer layers into a homogeneous whole, but instead, each layer is formed into a homogeneous layer having bonded therein the reinforcing plies, but not being vulcanized or bonded to its adjacent elastomer layers. Quite obviously, depending upon the area of the pressure membrane, almost any desirable number of discrete, reinforced elastomer layers may thus be obtained. If desired, the innermost portion 17 of the innermost elastomer layer may be relatively free of reinforcing plies so as to provide a smooth and impervious coating or liner on the inner pressure face of the membrane.

In one particular embodiment of the invention illustrated in FIG. 1 and FIGS. 3 through 9, the pressure tube 10 is enclosed in an elongate cylindrical housing 18 having a smooth inner liner 19 and one closed end 20. When employed as a surge dampener for the outlet of a compressor 21, as shown in FIG. 9, the outlet conductor 22 of the compressor receives a branch conductor 23 which is connected through a valve 24 into the inlet end of the housing 18, as shown in FIG. 1. Thus, the conductor 23 and therefore the conductor 22 is placed in communication with the interior of the housing 18.

The opposite end of the housing 18 is open and internally screwthreaded to receive the externally screwthreaded head 25 of a mounting collar 26 projecting interiorly of the cylinder 18. The charging end of the pressure tube 10 telescopes over the mounting collar 26, as shown, and receives externally a clamping sleeve or ferrule 27 which confines the charging end of the sleeve 10 on the collar 26 in the pressure-tight manner. A charging conductor 28 having therein a valve 29 and pressure gauge 30 conducts through the head 25 into the interior of the collar 26 and the pressure tube 10. The opposite end of the pressure tube 10 is closed by an internally-received blind plug 31 around the exterior of which the tube 10 is clamped by a suitable pressure sleeve or ferrule 32.

The interior of the pressure tube 10 is charged with any suitable gas to the desired working pressure which will cause the tube 10 to flex outwardly substantially in the configuration of FIG. 2 into or nearly into engagement with the smooth inner liner 19 of the cylinder 18. Then as pressure surges are received through the conductor 23, the tube 10 will alternately flex inwardly and outwardly in accordance with the pressure surges or variations, and the surges are thus effectively dampened.

The invention may also take the form of a circular diaphragm, or a diaphragm of other configurations, as illustrated in FIGS. 10 and 11. Thus, as shown in FIG. 10, the diaphragm 33 has an outer layer 34 of reinforced elastomer on its inner or pressure side separated from an intermediate layer 35 of reinforced elastomer by a separation zone 36 of appreciable area, the intermediate layer 35 being separated from the outer or lower pressure side layer 37 by a smaller area separation zone 38. At the margins 39 of the diaphragm 33, all three layers are bonded or vulcanized together into a homogeneous mass. The diaphragm 33 is fabricated in the same manner as the pressure tube 10 and functions in the same manner to provide the same desirable results in that high pressure resistance is obtained while preserving the desired flexibility of the diaphragm.

Obviously, the principles of the invention may be applied to any pressure membrane when it is an objective to obtain high pressure resistance while preserving flexibility.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

1. A flexible elastomer membrane including at least three discrete sheets of reinforced vulcanized elastomer vulcanized together adjacent their marginal portions only into homogeneity, their entire medial portion being separated by thin flexible nonadherent sheets one of which completely overlies the other, one outer elastomer sheet being vulcanized to an inner elastomer sheet over an area greater than that over which the other outer elastomer sheet is vulcanized to an inner elastomer sheet.

References Cited

UNITED STATES PATENTS

| | | | |
|---|---|---|---|
| 2,730,131 | 1/1956 | Asp et al. | 42—103 |
| 2,875,786 | 3/1959 | Shelly | 138—30 |
| 3,208,721 | 9/1965 | McHugh | 92—103 XR |

LAVERNE D. GEIGER, *Primary Examiner.*

BRADFORD KILE, *Assistant Examiner.*